March 25, 1924.
G. G. TUTTLE
PISTON VALVE FOR COMPRESSORS
Filed June 7, 1923 2 Sheets-Sheet 1
1,487,769
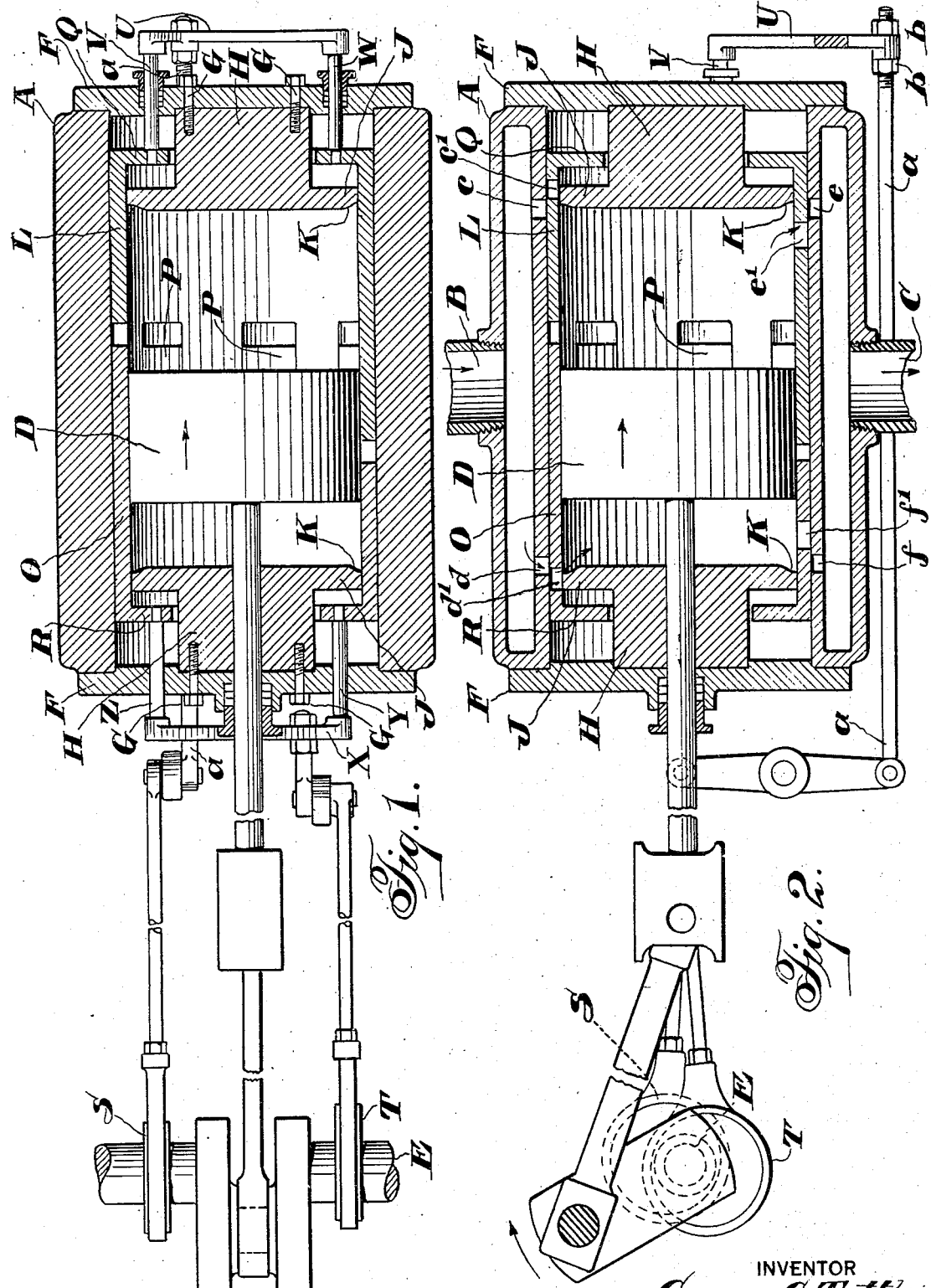
INVENTOR
Grover G. Tuttle.
BY
Herbert G. Ogden
HIS ATTORNEY March 25, 1924.
G. G. TUTTLE
PISTON VALVE FOR COMPRESSORS
Filed June 7, 1923   2 Sheets-Sheet 2
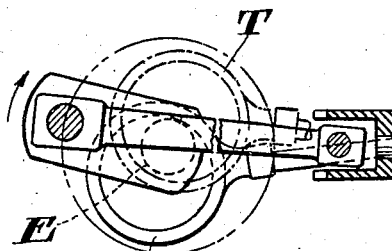
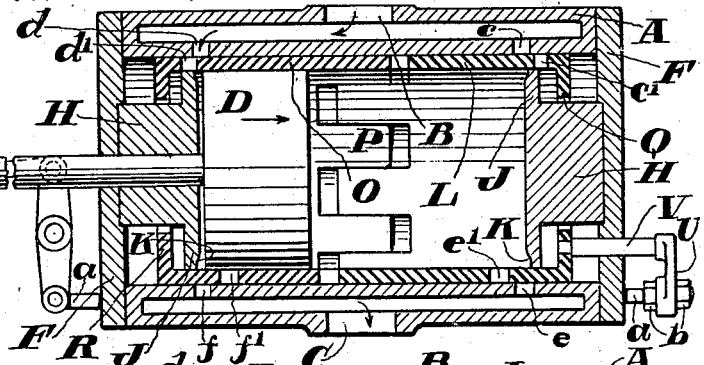
Fig. 3.
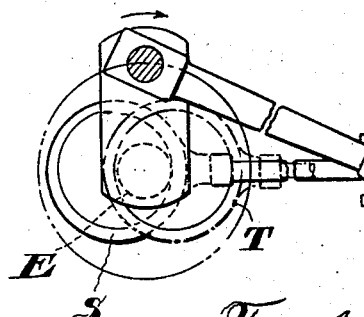
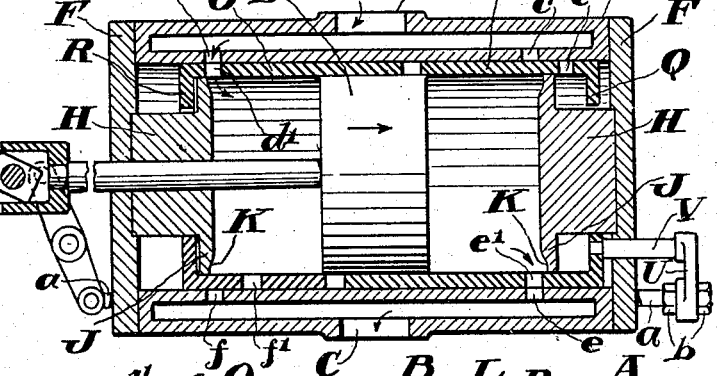
Fig. 4.
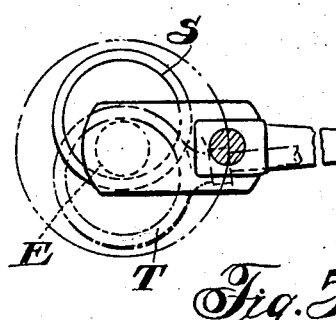
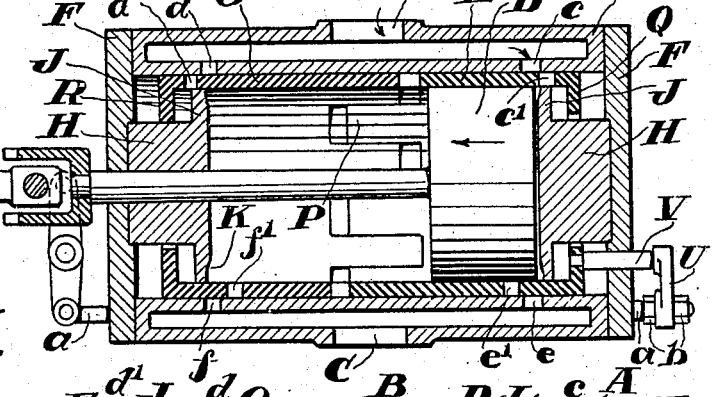
Fig. 5.
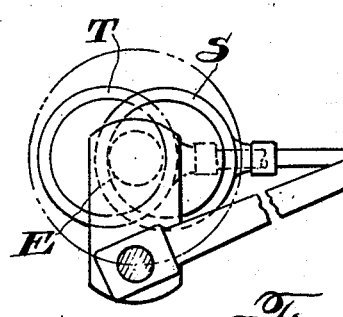
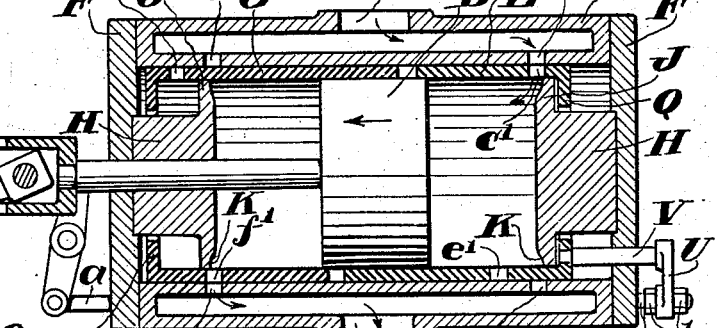
Fig. 6.
INVENTOR
Grover G. Tuttle.
BY
Herbert G. Ogden
HIS ATTORNEY Patented Mar. 25, 1924.

1,487,769

UNITED STATES PATENT OFFICE.

GROVER G. TUTTLE, OF PHILLIPSBURG, NEW JERSEY, ASSIGNOR TO INGERSOLL-RAND COMPANY, OF JERSEY CITY, NEW JERSEY, A CORPORATION OF NEW JERSEY.

PISTON VALVE FOR COMPRESSORS.

Application filed June 7, 1923. Serial No. 643,822.

*To all whom it may concern:*

Be it known that I, GROVER G. TUTTLE, a citizen of the United States, and a resident of Phillipsburg, county of Warren, and State of New Jersey, have invented a certain Piston Valve for Compressors, of which the following is a specification, accompanied by drawings.

This invention relates to compressors, but more particularly to a valve for controlling the inlet and discharge of the compressor cylinder.

One of the main objects of the invention is to enable the inlet and discharge of the compressor to be controlled by a mechanically operated valve, located wholly within the cylinder, and within which the piston reciprocates.

Another object of the invention, is to produce a valve adapted to operate within the cylinder, and which is capable of adjustment for different ratios of compression.

Further objects of the invention will hereinafter appear, and the invention is shown in one of its preferred forms in the accompanying drawings, in which—

Figure 1 is a top plan view, partly in horizontal section of so much of a compressor, valve and valve gear, as will serve to illustrate the invention.

Figure 2 is a side elevation partly in vertical section of the compressor shown in Figure 1, and Figures 3, 4, 5 and 6 are diagrammatic views partly in vertical section showing the relative positions of the piston and valves in the different positions of the piston stroke.

Referring to the drawings, the compressor cylinder A having the intake B and discharge C, is provided with the reciprocating piston D, driven in any suitable manner from the crank shaft E. The ends of the cylinder A are closed by the heads F to which the blocks H are secured in any suitable manner, as by the bolts G. The blocks H are formed with the enlarged heads J of less diameter than the inner diameter of the cylinder A and are provided with the beveled portions K.

The cylinder A is provided with the sleeve valves L and O for controlling the inlet and discharge of the cylinder. In this instance, the sleeve valves L and O are formed with dove-tail portions P, thus forming a smooth surface within which the piston D reciprocates. The outer ends of the sleeve valves L and O are formed with inwardly extending flanges Q and R respectively, which flanges cooperate with the enlarged heads J of the blocks H, to prevent excessive pressure being exerted on the ends of the valves L and O. Any pressure fluid in the space between the enlarged heads J and the head F will be churned back and forth in the movement of the flanged heads Q and R.

Any suitable operative devices and mechanism such as the eccentrics S and T, may be provided for mechanically actuating the members of the compressor valve. In this instance the eccentric strap S is pivotally connected to the yoke U to which the valve rods V and W are connected for actuating the sleeve valve L. The eccentric T is connected to the yoke X to which the valve rods Y and Z are connected for actuating the sleeve valve O. Any suitable means may be provided for adjusting the valves L and O relatively to each other, and in this instance, the yoke U is shown adjustably connected to the rod $a$ by the nuts $b$. By adjusting the yoke U inwardly, or outwardly on the rod $a$ by the nuts $b$, the sleeve valves L and O may be moved toward each other or away from each other as desired.

The sleeve valves L and O control the inlet and discharge of the cylinder. Pressure fluid is admitted to the cylinder through the ports $c$ and $d$ and discharged through the ports $e$ and $f$. The cut-off may be varied by adjusting the sleeve valves toward or away from each other for different ratios of compression. The eccentrics S and T are set at such an angle and in proper relation with the piston rod crank that the required timing of the sleeve valves is obtained.

In the operation of the machine, and first referring to Figure 3, the piston D is shown moving to the right from the extreme left of the cylinder A, and the inlet port $d$ is about to be uncovered by the corresponding port $d'$ in the sleeve valve O. At the same time, the discharge port $e$ of the cylinder is about to be uncovered by the corresponding port $e'$ of the sleeve valve L. Figure 4 shows the parts in the position they assume after the piston D has moved further to the right. In this position, the cylinder inlet port $d'$ is registered with the corresponding port $d$ of the sleeve valve O, and pressure fluid is being admitted to the cylinder. At the same time, the discharge port *e* of the cylinder has registered with the corresponding port *e'* of the sleeve valve L, and pressure fluid is being discharged through the discharge line C.

In Figure 5, the piston D is shown in its extreme right hand position in the cylinder A and starting on its movement toward the left of the cylinder. The inlet port *c* of the cylinder is about to be uncovered by the corresponding port *c'* of the sleeve valve O, while the discharge port *f* is about to be uncovered by the corresponding discharge port *f'* of the sleeve valve O. In Figure 6 the piston D has moved a slight distance to the left and pressure fluid is being admitted to the cylinder through the registered ports *c* and *c'* while the pressure fluid is being discharged from the cylinder through the registered ports *f* and *f'*. This cycle of operations will continue as the piston D reciprocates, the sleeve valves L and O alternately controlling the inlet and discharge of the cylinder.

I claim:

1. In a compressor, the combination with a cylinder and reciprocatory piston, of mechanically operated sleeve valves located wholly within the cylinder adapted to control the inlet to and discharge of pressure fluid from both ends of the cylinder, and in which the piston reciprocates.

2. In a compressor, the combination with a cylinder and reciprocatory piston, of a mechanically operated sleeve valve located wholly within the cylinder adapted to control the inlet to and discharge of pressure fluid from both ends of the cylinder, and adjustable means for varying the point of opening of the discharge from the cylinder for different ratios of compression.

3. In a compressor, the combination with a cylinder and reciprocatory piston, of a mechanically operated sleeve valve in which the piston is adapted to reciprocate located within the cylinder, adapted to control the inlet to and discharge of pressure fluid from the cylinder, and adjustable means for varying the point of opening of the discharge from the cylinder for different ratios of compression.

In testimony whereof I have signed this specification.

GROVER G. TUTTLE.